United States Patent
Haustein et al.

(10) Patent No.: US 8,825,094 B2
(45) Date of Patent: Sep. 2, 2014

(54) MOBILE COMMUNICATION DEVICE, NETWORK NODE, COMMUNICATION SYSTEM AND METHOD FOR DISTRIBUTED COOPERATIVE MULTI-ANTENNA COMMUNICATION

(75) Inventors: Thomas Haustein, Potsdam (DE); Thomas Wirth, Berlin (DE); Venkatkumar Venkatasubramanian, Berlin (DE)

(73) Assignee: Nokia Siemens Networks Oy, Espoo (FI)

( * ) Notice: Subject to any disclaimer, the term of this patent is extended or adjusted under 35 U.S.C. 154(b) by 414 days.

(21) Appl. No.: 13/133,221

(22) PCT Filed: Dec. 8, 2009

(86) PCT No.: PCT/EP2009/066627
§ 371 (c)(1),
(2), (4) Date: Aug. 8, 2011

(87) PCT Pub. No.: WO2010/066731
PCT Pub. Date: Jun. 17, 2010

(65) Prior Publication Data
US 2011/0287790 A1   Nov. 24, 2011

(30) Foreign Application Priority Data
Dec. 8, 2008   (EP) .................................... 08105954

(51) Int. Cl.
| | |
|---|---|
| *H04B 7/00* | (2006.01) |
| *H04B 1/06* | (2006.01) |
| *H04B 1/38* | (2006.01) |
| *H04B 7/06* | (2006.01) |
| *H04B 7/04* | (2006.01) |
| *H04B 7/02* | (2006.01) |

(52) U.S. Cl.
CPC ............ *H04B 7/0417* (2013.01); *H04B 7/0465* (2013.01); *H04B 7/0689* (2013.01); *H04B 7/0619* (2013.01); *H04B 7/024* (2013.01); *H04B 7/0469* (2013.01); *H04B 7/0697* (2013.01)
USPC .............. 455/500; 455/73; 455/272; 455/513

(58) Field of Classification Search
CPC ...................................... H04B 7/0417
USPC ................... 455/562.1, 101, 426.1
See application file for complete search history.

(56) References Cited

U.S. PATENT DOCUMENTS

| | | | | |
|---|---|---|---|---|
| 7,586,873 | B2 * | 9/2009 | Heath et al. | 370/329 |
| 7,961,807 | B2 * | 6/2011 | Kotecha et al. | 375/267 |

(Continued)

OTHER PUBLICATIONS

Samsung; "SU-MIMO PMI feedback and Compression"; R1-081744; 3GPP TSG RAN WG1 Meeting #53; May 5-9, 2008; whole document; Kansas City, USA.

(Continued)

*Primary Examiner* — Tilahun B Gesesse
(74) *Attorney, Agent, or Firm* — Harrington & Smith

(57) ABSTRACT

Network node for a distributed cooperative multi-antenna communication, including at least two sending and receiving units, wherein the network node is adapted to receive an indication of a protocol descriptor from a mobile communication device and wherein the network node is communicatively couplable with at least one further network node. Furthermore, the network node may be adapted to provide and/or receive an indication of a protocol descriptor and/or a channel access method to/from the at least one further network node.

20 Claims, 10 Drawing Sheets

(56) References Cited

U.S. PATENT DOCUMENTS

| | | | | |
|---|---|---|---|---|
| 7,965,780 | B2* | 6/2011 | Lindoff et al. | 375/260 |
| 7,978,623 | B1* | 7/2011 | Kotecha | 370/252 |
| 8,199,846 | B2* | 6/2012 | Kotecha et al. | 375/267 |
| 8,345,637 | B2* | 1/2013 | Heath et al. | 370/332 |
| 8,428,037 | B2* | 4/2013 | Heath et al. | 370/338 |
| 8,509,339 | B2* | 8/2013 | Kotecha et al. | 375/267 |
| 8,547,986 | B2* | 10/2013 | Kotecha | 370/432 |
| 8,582,674 | B2* | 11/2013 | Yu et al. | 375/260 |
| 8,594,207 | B2* | 11/2013 | Xiao et al. | 375/260 |
| 8,626,222 | B2* | 1/2014 | Kotecha | 455/513 |
| 8,634,841 | B2* | 1/2014 | Lee et al. | 455/450 |
| 8,644,402 | B2* | 2/2014 | Abrishamkar et al. | 375/260 |
| 8,665,971 | B2* | 3/2014 | Abrishamkar et al. | 375/260 |
| 2005/0174981 | A1* | 8/2005 | Heath et al. | 370/342 |
| 2008/0267056 | A1 | 10/2008 | Aryanfar et al. | |
| 2008/0299917 | A1 | 12/2008 | Alexiou et al. | |
| 2011/0287790 | A1* | 11/2011 | Haustein et al. | 455/500 |
| 2012/0088514 | A1* | 4/2012 | Lee et al. | 455/450 |
| 2013/0301746 | A1* | 11/2013 | Mobasher et al. | 375/267 |
| 2014/0003395 | A1* | 1/2014 | Hsu et al. | 370/335 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications"; IEEE Std. 802.11-2007 (Revision of IEEE Std. 802.11-1999); IEEE Computer Society; Jun. 12, 2007; whole document; New York, NY, USA.

"IEEE Standard for local and metropolitan area networks; Part 16: Air Interface for Fixed Broadband Wireless Access Systems"; IEEE Std. 802.16-2004 (Revision of IEEE Std. 802.16-2001); IEEE Computer Society and the IEEE Microwave Theory and Techniques Society; Oct. 1, 2004; whole document; New York, NY, USA.

3GPP TS 36.211 V8.3.0 (May 2008), "3$^{rd}$ Generation Partnership Project; Technical Specification Group Radio Access Network: Evolved Universal Terrestrial Radio Access (E-UTRA); Physical Channels and Modulation (Release 8)", 77 pgs.

Wu, K., et al., IEEE 806.16 Broadband Wireless Access Working Group, "SDD Details for Downlink Multi-cell MIMO", Sep. 5, 2008, Alcatel Shanghai Bell, 6 pgs.

Wirth, T., et al., "Polarisation Dependent MIMO Gains on Multiuser Downlink OFDMA with 1 3GPP LTE Air Interface in Typical Urban Outdoor Scenarios", Mar. 2008, 5 pgs.

R1-084444, 3GPP TSG RAN WG1 #55, Texas Instruments, "Aspects of Coordinated Multi-point Transmission for Advanced E-UTRA", Prague, Czech Republic, Nov. 11-15, 2008, 5 pgs.

R1-084141, 3GPP TSG RAN WG1 #55 Meeting, Alcatel-Lucent, "UE PMI Feedback Signalling for User Pairing/Coordination", Prague, Czech Republic, Nov. 10-14, 2008, 3 pgs.

R1-082886, 3GPP TSG RAN WG1 Meeting #54, Samsung, "Inter-Cell Interference Mitigation Through Limited Coordination", Jeju, Korea, Aug. 18-22, 2008, 9 pgs.

R1-080693, 3GPP TSG RAN WG1 Meeting #52, Samsung, "SU-MIMO PMI Feedback and Compression", Sorrento, Italy, Feb. 11-15, 2008, 5 pgs.

* cited by examiner

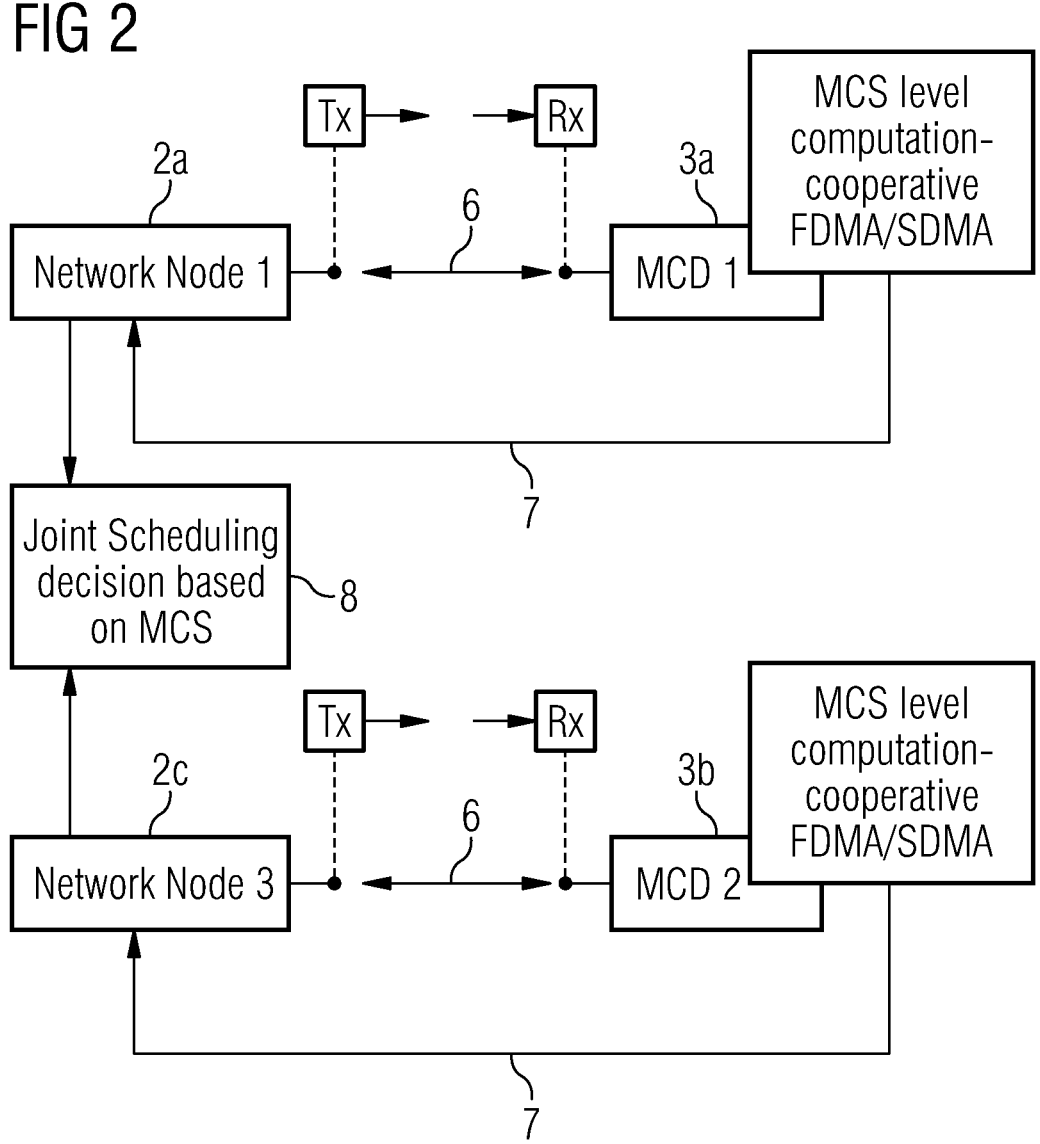

FIG 3A

| Codebook index | $u_n$ | Layers | |
|---|---|---|---|
| | | 1 | 2 |
| 0 | $u_0 = [1\ -1\ -1\ -1]^T$ | $W_0^{\{1\}}$ | $W_0^{\{14\}}/\sqrt{2}$ |
| 1 | $u_1 = [1\ -j\ 1\ j]^T$ | $W_1^{\{1\}}$ | $W_1^{\{12\}}/\sqrt{2}$ |
| 2 | $u_2 = [1\ 1\ -1\ 1]^T$ | $W_2^{\{1\}}$ | $W_2^{\{12\}}/\sqrt{2}$ |
| 3 | $u_3 = [1\ j\ 1\ -j]^T$ | $W_3^{\{1\}}$ | $W_3^{\{12\}}/\sqrt{2}$ |
| 4 | $u_{10} = [1\ 1\ 1\ -1]^T$ | $W_{10}^{\{1\}}$ | $W_{10}^{\{13\}}/\sqrt{2}$ |
| 5 | $u_{11} = [1\ j\ -1\ j]^T$ | $W_{11}^{\{1\}}$ | $W_{11}^{\{13\}}/\sqrt{2}$ |
| 6 | $u_{12} = [1\ -1\ -1\ 1]^T$ | $W_{12}^{\{1\}}$ | $W_{12}^{\{12\}}/\sqrt{2}$ |
| 7 | $u_{13} = [1\ -1\ 1\ -1]^T$ | $W_{13}^{\{1\}}$ | $W_{13}^{\{13\}}/\sqrt{2}$ |
| 8 | $u_{14} = [1\ 1\ -1\ -1]^T$ | $W_{14}^{\{1\}}$ | $W_{14}^{\{13\}}/\sqrt{2}$ |
| 9 | $u_{15} = [1\ 1\ 1\ 1]^T$ | $W_{15}^{\{1\}}$ | $W_{15}^{\{12\}}/\sqrt{2}$ |
| 10 | | | $\begin{bmatrix} A_1 \\ 0 \end{bmatrix}$ |
| 11 | | | $\begin{bmatrix} A_2 \\ 0 \end{bmatrix}$ |
| 12 | | | $\begin{bmatrix} A_3 \\ 0 \end{bmatrix}$ |
| 13 | | | $\begin{bmatrix} 0 \\ A_1 \end{bmatrix}$ |
| 14 | | | $\begin{bmatrix} 0 \\ A_2 \end{bmatrix}$ |
| 15 | | | $\begin{bmatrix} 0 \\ A_3 \end{bmatrix}$ |

FIG 3B $$A_1 = \frac{1}{\sqrt{2}} \begin{bmatrix} 1 & 0 \\ 0 & 1 \end{bmatrix},\ A_2 = \frac{1}{\sqrt{2}} \begin{bmatrix} 1 & 1 \\ 1 & -1 \end{bmatrix},\ A_3 = \frac{1}{\sqrt{2}} \begin{bmatrix} 1 & 1 \\ j & -j \end{bmatrix}$$

- - - - 4x2 (22 precoders)- codebook acc. to invention
••••••••• 2x2 (3 precoders)
- - - - 4x2 (16 precoders)- current LTE
———— 4x2 (16 precoders)- codebook acc. to invention

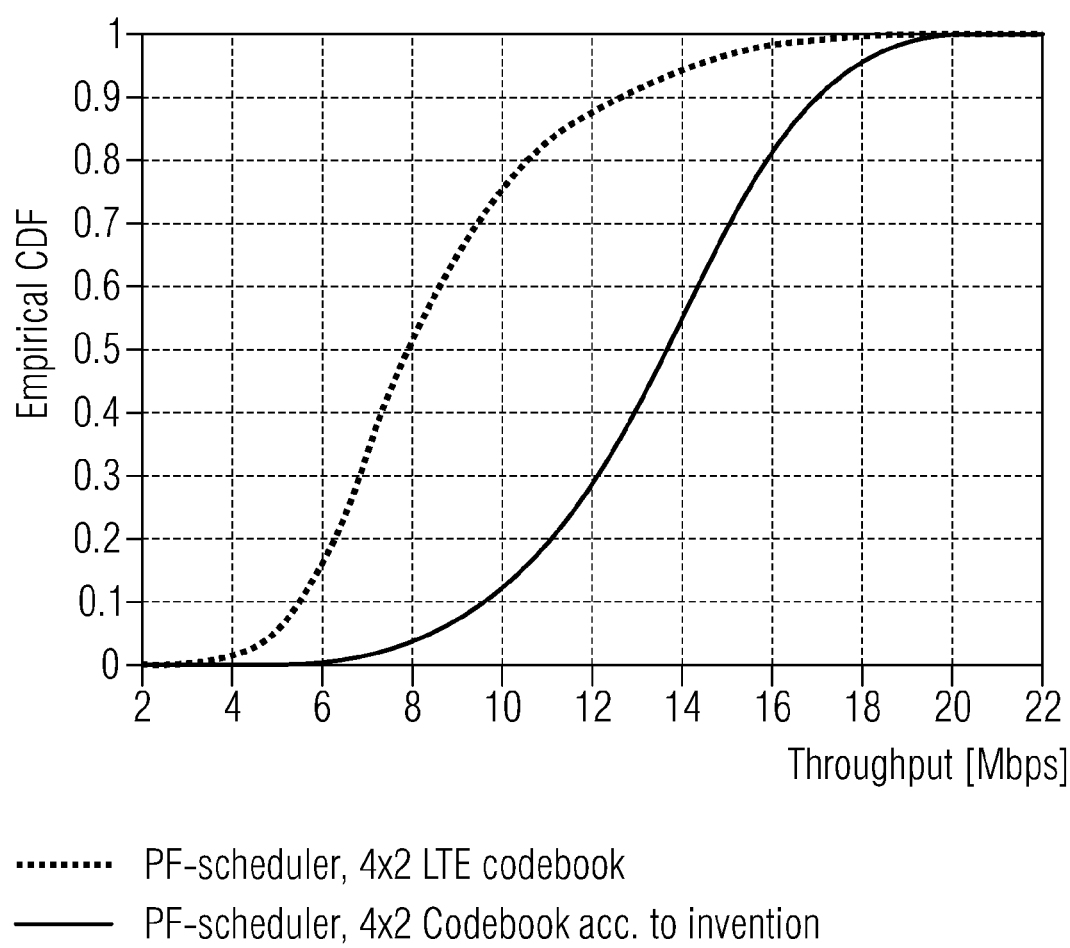

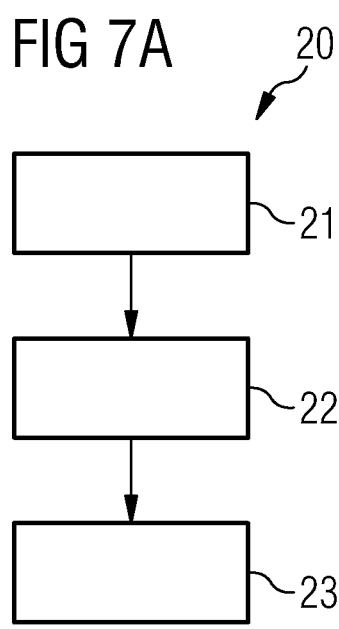
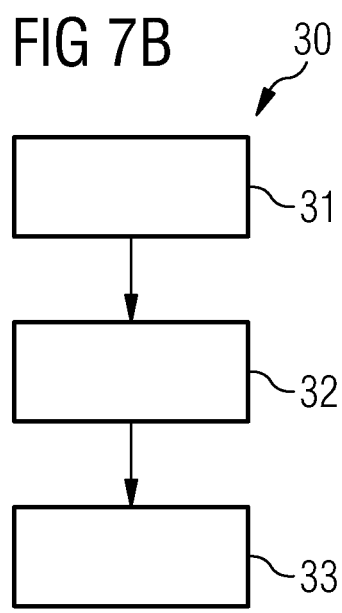

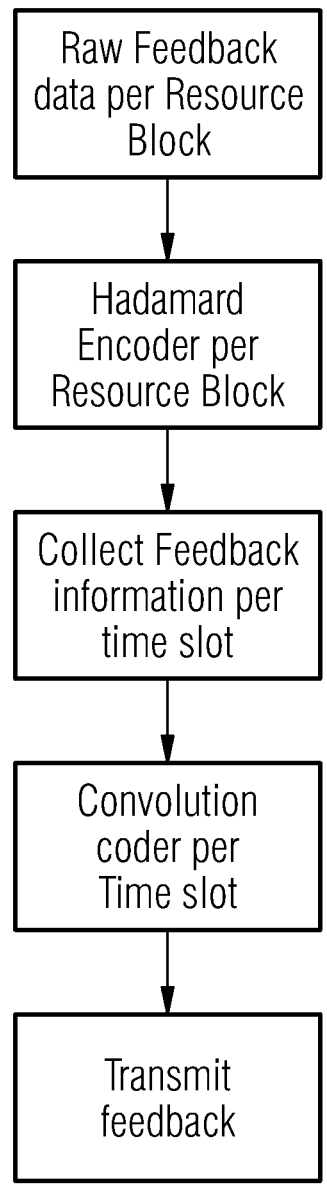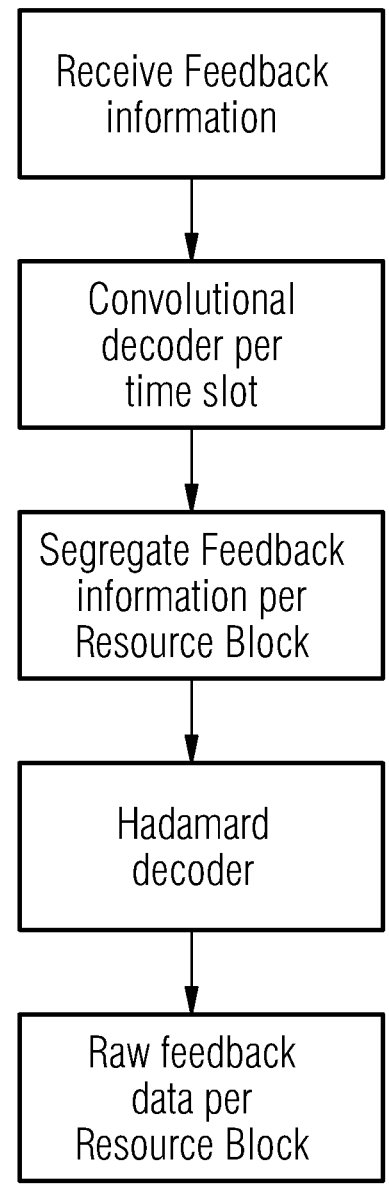

US 8,825,094 B2

MOBILE COMMUNICATION DEVICE, NETWORK NODE, COMMUNICATION SYSTEM AND METHOD FOR DISTRIBUTED COOPERATIVE MULTI-ANTENNA COMMUNICATION

TECHNICAL FIELD OF THE INVENTION

The present invention relates to wireless communication in general. More particularly, the invention relates to a mobile communication device for distributed cooperative multi-antenna communication, to a network node for distributed cooperative multi-antenna communication, to a communication system, to a method of feedback communication of a mobile communication device to a network node, to a method for determining a protocol descriptor and to a method for determining of a protocol descriptor for distributed cooperative multi-antenna communication.

In particular, it relates to determining preferable channel dependent communication parameters for minimizing interference between a mobile communication device connected to a network node, a further mobile communication device connected to a further network node being located in ones another vicinity and to calculation of a preferred signalling method for a group of network nodes and signalling an instruction or indication of the signalling method to the network nodes.

BACKGROUND OF THE INVENTION

In wireless networks, e.g. Long Term Evolution (LTE), Wimax IEEE 802.16 or WLAN IEEE 802.11, multiple antenna systems may be employed for enhancing spectral efficiency.

However, the enhancement of spectral efficiency may be achieved also by assigning resources to individual users of a communication in such a way as to exploit their respective differing channel conditions.

This approach may be used in conjunction with multi-antenna techniques and may be realized by using multi-user resource scheduling.

Multi-user scheduling may be combined with Orthogonal Frequency Division Multiplex (OFDM) to arrive at a multi-user OFDM or OFDMA (OFDM Access).

With OFDMA, multiple users may communicate using the same timeslot but being assigned to different frequency resources.

However, the throughput performance of Multiple Input Multiple Output OFDMA (MIMO-OFDMA) systems may be considered to be interference limited. This may be because the throughput performance of a MIMO-OFDMA transmission, in particular the downlink may be limited by interference from adjacent cells.

There may be a need to provide a more efficient throughput.

3GPP ($3^{rd}$ Generation Partnership Project) document, technical specification group radio access network, 3GPP TS 36.211 V8.3.0 describes physical channels and modulation in evolved universal terrestrial radio access (E-UTRA).

The document T. Wirth, A. Forck, S. Wahls, V. Jugnickel, V. Venkatkumar, T. Haustein, H. Wu: "Polarization dependent MIMO gains on multi-user downlink OFDM with a 3GPP LTE air interface in typical urban outdoor scenarios" ITG-WSA 2008, March 2008 describes gain benefits when using cross-polarized antennas as compared to co-polarized antennas at network nodes.

The Document 3GPP TSG RAN WG1 Meeting #52, R1-080693, Sorrento, Italy, Feb. 11-15, 2008, describes single user MIMO Precoder Matrix Indicator feedback and compression and the Fubiny-Study distance criteria.

SUMMARY OF THE INVENTION

Signaling schemes from a mobile communication device to a base station may be proposed in this invention. The signaling format may be required to be understood by network nodes for downlink data transmission.

Usage of this invention may be detected by the mobile communication device feedback mechanism.

The invention may disclose amongst others two different protocol descriptors or modulation coding scheme levels, one in particular for Frequency Division Multiplex (FDMA) with cooperation and other for Spatial-Division Medium Access (SDMA) with cooperation which may also be detectable via the mobile communication device feedback mechanism.

Furthermore, a new efficient feedback mechanism for OFDM wideband communication is proposed (Tree-based PMI)

Furthermore, methods for feedback reliability improvement, compression and verification may be provided. These signaling schemes may be implemented by a mobile communication device and the protocol may be made known to base station.

According to an exemplary embodiment of the present invention, a mobile communication device for distributed cooperative multi-antenna communication, a network node for distributed cooperative multi-antenna communication, a communication system, a method for determining of a protocol descriptor and a method for determining of a protocol descriptor for distributed cooperative multi-antenna communication according to the independent claims are provided.

According to an exemplary embodiment of the present invention, a mobile communication device for distributed cooperative multi-antenna communication is provided comprising a sending and receiving units adapted to be communicatively couplable (coupleable) with a network node, wherein the mobile communication device is adapted to determine channel state information and wherein the mobile communication device is adapted to provide an indication of a protocol descriptor based at least in part on the determined channel state to a network node.

According to a further exemplary embodiment of the present invention, a network node for distributed cooperative multi-antenna communication is provided, comprising at least two sending and receiving units, wherein the network node is adapted to receive an indication of a protocol descriptor from a mobile communication device and wherein the network node is communicatively couplable with at least one further network node.

According to a further exemplary embodiment of the present invention, a communication system is provided comprising at least a first and a second mobile communication device according to the present invention, at least a first and a second network node according to the present invention, wherein the first mobile communication device is communicatively coupled with the first network node, wherein the second mobile communication device is communicatively coupled with the second network node and wherein the first network node and the second network node are communicatively coupled.

According to a further exemplary embodiment of the present invention, a method for determining of a protocol descriptor is provided, comprising determining channel state information of a communication channel, determining a protocol descriptor at least in part by employing channel state information and/or at least one code of a list of transmission codes for distributed cooperative multi-antenna communication and providing an indication of the determined protocol descriptor to a network node.

According to a further exemplary embodiment of the present invention, a method for determining of a protocol descriptor for distributed cooperative multi-antenna communication is provided, comprising receiving an indication of a determined protocol descriptor from a mobile communication device, receiving an indication of a determined protocol descriptor from at least one network node, determining a protocol descriptor for distributed cooperative multi-antenna communication at least in part based upon the received indication of the determined protocol descriptor from the mobile communication device and the received indication of the determined protocol descriptor from the at least one network node.

According to a further exemplary embodiment of the present invention, a computer-readable medium is provided in which a computer program is stored, which computer program, when being executed by a processor, is adapted to carry out at least one method according to the present invention.

According to a further exemplary embodiment of the present invention, a program element is provided, which program element, when being executed by a processor, is adapted to carry out at least one method according to the present invention.

In the following, further embodiments of the present invention are described referring in particular to either a mobile communication device for distributed cooperative multi-antenna communication, to a network node for distributed cooperative multi-antenna communication, to a communication system, to a method for determining of a modulation coding scheme and to a method for determining of a modulation coding scheme for distributed cooperative multi-antenna communication.

However, arbitrary variations and interchanges of single and/or multiple features between the claimed entities is conceivable and within the scope and disclosure of the present patent application.

It is also noted, that embodiments and aspects of the present invention have been described with respect to different subject-matters. In particular, some embodiments have been described with reference to apparatus type claims, whereas other embodiments have been described with reference to method type claims.

However, a person skilled in the art will gather from the above and the following that, unless notified otherwise, in addition to any combination features belonging to one type of subject-matter also any combination between features relating to different subject-matters, in particular between features of apparatus claims and features of method claims is considered to be disclosed within this application.

A protocol descriptor is to be understood as at least one element out of the group consisting of a modulation and coding format (in particular modulation coding scheme or level), a precoder matrix index, an indication of a number of transmission streams and a least one base station (network node) id.

In particular, the indication of a protocol descriptor may be communicated to a central node, to a gateway or to a set of base stations/network nodes.

One aspect of the invention may be seen in increasing throughput performance of a MIMO-OFDMA system or multi-user OFDMA by reducing and/or minimizing interference.

This may be achieved by letting interfering cells cooperate with each other. This so-called 'Cooperative-MIMO' may represent an evolutionary step from the single cell MIMO systems to LTE-Advanced technology. Furthermore, the cooperating network nodes may also collaborate and jointly schedule by combining the pool of frequency resources.

Reducing interference, thus improving throughput performance, may be achieved by allowing network nodes (e.g. base stations of a communication network) of adjacent sections/sectors or communication cells to cooperatively beam forming.

Beam forming may be seen as a strategy of precoding the user signal to best match the channel. Such a precoding may be ideally performed by the so-called singular value decomposition (SVD) operation. The transferrable data rate may be increased by this precoding process. In case of deploying fixed codebooks, this operation is akin to selecting the best codebook to increase the transferrable data rate over a varying number of streams.

Furthermore, the network nodes may jointly schedule the communication (determine appropriate communication parameters to minimize interference in coordination), thus may reuse the spectrum. This may be understood as that the network nodes are transmitting on the same frequency channel without having to divide the frequencies between each other.

However, according cooperative MIMO systems may require a complete feedback comprising complete channel state information from all mobile communication devices.

Consequently, a distributed feedback mechanism employed by mobile communication devices to realize the benefits of cooperative MIMO may be beneficial.

In other words, network nodes may not directly receive channel state information from all relevant mobile communication devices but rather may only receive a limited number of direct feedbacks with the other relevant negotiation or scheduling being performed be the connected network nodes themselves.

In FDD systems, as the number of feedback bits (i.e. the amount of bits used for signaling or transmitting feedback) is increased, a higher precision on the channel quality may be reported back to the transmitter about the downlink using the uplink. This overhead results in a higher downlink performance.

However, this overhead may also result in that the resources used for feedback may not be utilized for data transmission in the uplink. Therefore, feedback design strategies, which achieve high performance in both uplink and downlink transmission may be preferred.

Aspects for cooperative signaling from base station may be seen as follows:

Improving the channel conditioning via cooperation to maximize the capacity of multiplexing mode.

Improving received signal power (in particular, improving the signal-to-noise ratio and/or the signal-to-interference ratio) so as to increase the capacity of diversity and/or multiplexing mode.

Interference mitigation by mutually signaling on the null space of users. This signaling mechanism enables full frequency re-use on the interfering cell sites.

Nullspace may relate to precoding a user's signal orthogonally to another user's channel. Orthogonally may refer to making the product HQ=0, where H is another user's channel and Q is the precoder. Nullspace may be obtained from the SVD operation. The precoder Q consists of precoding vectors corresponding to zero singular values after decomposing a user's channel with SVD.

Accordingly, two issues may arise: Firstly, an efficient precoding table or codebook for distributed antenna systems and secondly, an efficient way of communicating the codebook from a mobile communication device to a network node, also called device feedback may be required.

Accordingly, a codebook design or codebook for transmission with multiple antennas, is provided.

Thus, a codebook for distributed MIMO systems is provided, which may allow exploiting polarization dependent gains and/or switching between 4-antenna transmission mode and 2-antenna transmission mode adaptively.

An according codebook may be understood as a list, array, data structure, database directory or compilation of codes or parameters used for negotiating and communicating between at least two communication entities. The codes may in particular be employed for precoding of the transmission.

A codebook design according to the present invention may allow cooperative MIMO transmission with full spectral reuse and in particular may allow a beneficial cross-polarized antenna deployment in adjacent sites.

The codebook may also allow adaptive switching between 4-antenna transmission and 2-antenna transmission. Depending on communication related circumstances, a 2-antenna cross-polarized transmission may provide a preferred transmission over a 4-antenna cooperative transmission, as per the channel conditions.

Two influencing metrics for a decision for adaptive switching may in particular be the received power and the so-called condition number of the channel. Condition number relates to how correlated the channel is between the transmitters and/or receivers.

The inventive Codebook designs for network node transmission with 4 antenna ports may be adapted for distributed antenna ports in cooperative MIMO networks.

Known codebooks assume channel symmetry between all the transmit antennas and receive antennas.

Accordingly, channel conditioning may be required to be improved, in particular by reducing the transmitter channel correlation. Cooperation by distributed network nodes may be used to reduce the transmitter correlation because of spatial separation of the network nodes.

Moreover, switching from multiplexing to diversity mode, i.e. varying the number of transmission streams, called multistream switching, may be performed.

The stream switching mechanism may be vital to cater heavily shadowed users by making use of diversity gains.

However, the channel conditioning may not be the limiting factor for supporting multiple spatial streams in multiplexing mode, since received signal power may be a more important factor.

Maximizing diversity and multiplexing may become mutual with the deployment of polarized antennas at the cell sites.

Therefore, a cooperative mechanism which maximizes diversity may also maximize multiplexing in particular in the case of polarization multiplexing. This may be understood as maximizing the throughput achievable with either of these transmission modes.

The codebook designs may be adapted such that it does consider exploiting polarization dependent gains by switching between 4 antenna ports to 2 antenna transmission ports as an example.

This adaptation may even in particular be relevant when considering the amount of frequency resources in LTE systems. The mobile communication device may be adapted to adaptively choose a sub-set of cooperating network nodes in order to maximize the received signal power.

The deployment of polarized antennas may increase the probability of base station sub-set selection by a mobile communication device (e.g. user device).

According to an aspect of the invention, the current codebook design may be extended for distributed antenna systems.

The mobile communication devices and/or the network nodes may collectively (e.g. jointly agree upon a codebook of at least a part thereof) communicate the preferred precoding codebook. In other words, mobile communication devices and/or the network nodes may determine a precoder that maximizes throughput and/or minimizes interference of adjacent cells. Furthermore, the transmission mode (multiplexing or diversity) may be communicated from the mobile communication device to a network node.

This may in particular relate to issues such as an increase in the number of transmitting stations (e.g. in multi-hop applications), an increase in the numbers of receive antennas to exploit more diversity, an increase in the codebook size and an increase in the allocated bandwidth.

The inventive methods may comprise providing information about transmission modes and/or may be adaptable to distributed transmission stations.

Accordingly, the following aspects relate to the present invention:

Cooperative signalling with sub-set of network nodes cooperating based on a precoding matrix indicator (PMI) feedback of a mobile communication device. This is also called sub-set unification.

Furthermore, a precoding table design is provided for cooperative MIMO systems.
1. A precoding table may be chosen from a systematic design, as in the LTE current draft. Other designs such as Hadamard, FFT, Grassmanian codebooks, random codebook designs may be unified.
2. Codebooks belonging to different precoding designs may also be unified. For instance, it might be preferential to operate a 2×2 MIMO on FFT codebooks, a 4×4 system on systematic codebooks and a 8×8 system again on FFT codebooks.
3. In principle, Sub-set unification may be understood as dynamically choosing the number of cooperating base stations with a sum transmit power constraint. The method according to the present invention may be able to convey this information to the base stations via the PMI feedback.

Also, a FDMA to SDMA mode switching mechanism is provided using precoding tables. This mode switching may be dynamically controlled with feedback of a mobile communication device.

A so-called "tree-based precoder matrix indexing protocol feedback" mechanism is provided. This protocol may reduce feedback load in FDD uplink while achieving cooperative gains.

Furthermore, a per resource block feedback protection code design over the uplink, a feedback compression mechanism based on run-length encoding, a feedback method for SDMA mode support and a feedback verification check using a channel quality indicator (CQI) inequality check is provided Following, a distributed feedback mechanism originating from mobile communication devices may allow efficient base station cooperation.

In particular, an adaptive switching, for example performed by the mobile communication device, between transmission modes, e.g. between Spatial-Division Medium Access (SDMA) mode and Frequency-division multiple access (FDMA) macro-diversity mode, may allow determining a preferred transmission mode, depending on the channel conditions (e.g. the related channel state information).

Channel conditions may in particular refer to signal power, interference power and the transferrable data rate calculated as the output of a MMSE detector.

An according adaptive switching may exploit wide band interference pattern which may be considered to be randomized by the wireless medium. In a wireless transmission, a channel may be seen as not to be fixed. It may vary over space, time and also frequencies, thus may be seen as being randomized.

The transmission, the transmission mode and/or the channel access method to be employed may be determined dependent on a signal-to-noise ratio and/or an interference-to-noise ratio, i.e. the received powers from the intended and the interfering network node, or channel conditions. Due to the frequency selectivity of a channel, different time-frequency resource blocks may experience different signal and interference fades from a particular network node.

A weak interference case may be characterized by interference power being less than the noise floor. A strong interference case may be characterized by the interference power being substantially equal to the signal power. A weak interference and signal power case may be characterized by the interference power being less than the noise floor, i.e. S/N<<1, I/N<<1. A strong interference and signal power case may be characterized by S/N>>1, I/N>>1.

Consequently there may exist the combinations of signal-to-interference power as shown in table 1.

TABLE 1

| Group | Signal power (Network Node 1) | Interference power (Network Node 2) | Classification |
|---|---|---|---|
| 1 | Strong | Weak | High signal to interference noise ratio |
| 2 | Weak | Strong | High signal to interference noise ratio |
| 3 | Strong | Strong | Low signal to interference noise ratio |
| 4 | Weak | Weak | Low signal to interference noise ratio |

Especially in the case of group 1 and group 2, a codebook according to the present invention may be utilized for cross-polarized transmission, while limiting the feedback overhead to four bits, equivalent to 16 codebook entries.

Two issues may in particular be related hereto.

In group 1, a communication between a mobile communication device and a network node may perform beamforming without requiring considering or avoiding interference. Thus, a user grouping technique may be employed such as combining a user of group 1 with a user of group 2, which may then be scheduled to transmit in the substantially identical time slot and/or frequency slot.

Deployment of cross-polarized antennas may be beneficial regarding peak throughput gains in Line of Sight (LOS) conditions. This fact arises because the channels may be better conditioned with cross-polarized transmission. The antennas of the network node of an individual cell may therefore be cross-polarized.

The following principles and definitions are employed within the context of the invention:

User grouping for Optional SDMA Mode Switching

This may be seen as a mechanism to exploit SDMA mode switching at network nodes based on limited or reduced feedback from mobile communication devices. E.g, the SDMA mechanism may enable full-reuse with 4 spatial stream to 2 users.

The precoding matrix indicator may be used for interference mitigation. For that, a precoder for interference mitigation is fedback to the network node exploiting the Fubiny-study criteria or a further suitable criterion such as chordal distance or interference.

PMI farthest way may indicate the PMI with the most Fubiny-Study distance w.r.t best PMI.

Given a wideband precoder $W_p$, then we may calculate the modified Fubiny-Study distance to every other precoder as the $$d(p, q) = |\det(W_p^H W_q)| = \prod_i \cos(\theta_i).$$

Here, $\theta_i$ represents the i'th principle angle (singular value of the signal subspace) with i<rank, of the inner product between $W_p$ and $W_q$ since both $W_p$ and $W_q$ are unitary.

Given that we expect that the differential PMI's should be correlated to the wideband PMI ($W_p$), we would select the differential indexes as the 4 (2 bits in this example) with the largest distances to $W_p$.

This means that all the layers of the differential PMI has to match well with the wideband PMI, and any differential PMI which has even a single orthogonal layer with $W_p$ will be excluded.

Tree-Based PMI

Overall wideband feedback information comprises of two parts; global and local. E.g. for a 4 transmit antenna cooperative scheme may employ local feedback per resource block by providing the following types of information by signaling the PMI indicator using 2 bits and a CQI using 4 bits.

Global feedback per time slot may be signaled by an PMI indicator using 16 bits, a PMI spatial mode using 2 bits and a number of PMI using 2 bits.

A significant advantage of the tree-based mechanism may be that it allows a low complexity method to indicate the selection between diversity and multiplexing for each resource block (RB) for each user. This mode-selection may provide a so-called hybrid 'multiplexing-diversity' grouping in combining in SDMA mode one user with diversity transmission and a further user with multiplexing transmission.

Composite CQI Feedback:

CQI Feedback for SDMA Interference Mode relates to how to feedback the bit loading CQI information. This may in particular be relevant since the number of feedback bits for CQI feedback may be large, e.g. 4 bits per spatial stream.

For reducing feedback load, the redundancy in CQI information over the frequencies may be employed. This redundancy arises due to channel correlation over adjacent frequency resource blocks. In particular, the channel between adjacent frequency sub-carriers in OFDM may be correlated.

Thus, feedback CQI information for FDMA mode and SDMA mode may be provided in odd/even resource blocks.

This SDMA mode may be interpreted as follows:

Each user may feedback the best PMI and the mode of operation, i.e. diversity or multiplexing.

Following, the CQI for standalone FDMA mode may be indicated. Now, each user may also feedback the PMI which mitigates interference, for multiplexing mode. The PMI which mitigates interference in diversity mode may be taken to be the subset of the multiplexing PMI.

The CQI for SDMA, interference mode may also be indicated. Interference may be taken to be multi-stream, which may be considered as the worst case interference when the interfering terminal is transmitting independent data streams over different antennas. The CQI for SDMA, interference with less number of interfering streams may be calculated via interpolation of the FDMA and SDMA in full interference mode.

CQI reduction may employ mode interleaving as follows:

The number of combinations of number of spatial streams to an intended user and interference streams, may increase with the number of network node antennas or cooperating network nodes. 4 bits of CQI feedback per stream per mode per resource block may be considered to be a unmanageable increase in feedback bits.

For reduction of CQI feedback data, may exploit the benefits of SDMA mode by the so-called 'interpolation and interleaving' method.

This method may be implemented as follows:

Accurate 4 bit CQI feedback (Modulation and Coding) may be used only for certain combinations of number of data streams and interfering streams in the SDMA mode. Accurate CQI feedback may be employed in FDMA mode. Interpolation may be used in the network node to calculate the CQI value for other possibilities of SDMA mode.

In bitloading for a user at a network node, bits are interleaved over different levels of CQI feedback, e.g. FDMA, SDMA accurate CQI and SDMA interpolated CQI. Thus, bits belonging to data of a user may be spread over different CQI reliabilities. Accurate CQI may be more reliable than interpolated CQI.

Furthermore, different levels of CQI feedback may be adopted for various SDMA modes, for example, one with 4 bit feedback, a certain number with 2 bit CQI feedback and a certain number with 1 bit CQI feedback.

Bit interleaving may then be performed over varying CQI feedback qualities to obtain combined code diversity and error diversity.

Furthermore, feedback compression may also possible. A lossless compression technique which may suitable for this purpose is run-length encoding, which is also used in communication technologies such as Fax. This operation may be interpreted as the inverse of repetition coding. With this method, the format for feedback may look as shown in table 2.

TABLE 2

| Type of Information | # of Repetitions | Feedback Information |
|---|---|---|
| # of Bits | x | y |

E.g. 1111000000001111 is mapped as 010 1 100 0 010 1.

010 means 4 times repeated. 100 means 8 times repeated. The type of bits indicates whether CQI or PMI, etc. is employed.

Compression and reliability encoding may in particular be seen different, opposite approaches. One decreases length of data, the other increases.

On the contrary, to the preference of deployment, a feedback protection mechanism may be provided. Reliable feedback from UE to BS may be important for two reasons.

Incorrect feedback because of packet errors occurring in the feedback link (uplink) may increase ARQ traffic (Automatic Repeat reQuest traffic) due to dropped packets in downlink. These errors may incur redundancy of over 3 times over a bi-directional link, twice for feedback and once for ARQ.

Furthermore, most network node schedulers may have strict detection mechanisms for malicious devices and fabricated CQIs. Therefore, there may be a possibility that incorrect feedback will be perceived as fabricated CQI by a network node scheduler. As a result the device may be relegated down the scheduling queue.

Furthermore feedback data verification is provided. Feedback data, unlike content data, may be verified for consistency at the transmitter end. The difference may be seen in that content data is a sole input process, while feedback data is an output of the channel input at the mobile communication device.

Each mobile communication device may calculate the CQI and PMI for all adaptive mode selections (diversity or multiplexing). Computing errors of PMI and CQI may thus be detected based on an "Inequality check for CQI values" check procedure.

For CQI verification, an inequality check may be proposed. This inequality is based on the fact that the overall transmit power for any number of selected streams is equal.

Therefore, if $c_i$ is the CQI value (i.e. the number of bits) for $i^{th}$ spatial stream in a transmit mode choosing to transmit S spatial streams out of $S_{max}$ streams, then the following formula may apply $$\sum_{P(S)}\sum_{i=1}^{i=S} c_i \geq \sum_{P(S+1)}\sum_{i=1}^{i=S+1} c_i$$

with P(S) being the possible ways of transmitting S spatial streams out of $S_{max}$ streams and $$|P(S)| = \frac{S_{max}!}{S!(S_{max}-S)!}$$

The above formula calculates the number of combinations possible.

In the following, further exemplary embodiments of the present invention will be described relating to a mobile communication device for distributed cooperative multi-antenna communication. However, these explanations also apply to a network node for distributed cooperative multi-antenna communication, to a communication system, to a method for determining of a protocol descriptor and to a method for determining of a protocol descriptor for distributed cooperative multi-antenna communication.

According to a further exemplary embodiment of the present invention, the mobile communication device may further comprise a memory unit, the memory unit comprising a list of transmission codes for distributed cooperative multi-antenna communication.

The transmission codes may in particular be understood as a codebook. Furthermore, the list of transmission codes may be understood as the codebook according to the present invention. Further in particular, the list of transmission codes may be seen as a part of the transmission codes according to the present invention, e.g. indexes 10 to 15 in the proposed codebook table. A codebook according to the present invention may be understood as a codebook for distributed cooperative multi-antenna communication.

A mobile device may select a code from a codebook depending on a channel condition or a channel state.

According to a further exemplary embodiment of the present invention, the mobile communication device may be adapted to employ at least one code of the list of transmission codes for distributed cooperative multi-antenna communication for determining at least in part the protocol descriptor.

By using an according code, in particular when taking into account channel state information, a code may be determined which allows for a preferred communication/transmission. Thus, by employing a preferred code transmission interference may be at least be reduced.

According to a further exemplary embodiment of the present invention, the mobile communication device may further be adapted to provide at least one transmission selected from the group consisting of single stream transmission, dual stream transmission, multiple stream transmission, 4-antenna cooperative transmission and 2-antenna cross-polarized transmission and/or at least one transmission mode selected from the group consisting of spatial division medium access, time division multiple access and frequency division multiple access.

By providing the aforementioned transmissions and/or transmission modes, the mobile communication device may adapt the transmission taking into account channel state information to arrive at a transmission/transmission mode most beneficial for a particular communication situation.

In the following, further exemplary embodiments of the present invention will be described relating to a network node for distributed cooperative multi-antenna communication. However, these explanations also apply to the mobile communication device for distributed cooperative multi-antenna communication, to the communication system, to the method for determining of a protocol descriptor and to the method for determining of a protocol descriptor for distributed cooperative multi-antenna communication.

According to a further exemplary embodiment of the present invention, the network node may further be adapted to provide and/or receive an indication of a protocol descriptor and/or a channel access method to/from the at least one further network node.

The indication may also consist of or comprise an indication or information/data regarding the employed code taken from the list of transmission codes for distributed cooperative multi-antenna communication, e.g. may be an index of the codebook.

By providing to or receiving from an at least one further network node an according indication, each of the at least two connected network nodes may thus schedule a transmission with a mobile communication device while reducing and/or minimizing interference between the transmissions.

According to a further exemplary embodiment of the present invention, the network node may be adapted to determine a channel access method for communication with the mobile communication device, the determination further based at least in part on the received indication of a protocol descriptor and/or channel access method of the mobile communication device and/or a received indication of a protocol descriptor and/or a channel access method of the at least one further network node.

By receiving/acquiring the information, the network node may be able to determine parameters for a preferred transmission, e.g. a transmission with increased transfer rate and/or reduced interference.

According to a further exemplary embodiment of the present invention, at least one of the at least two sending and receiving units of the network node may be of cross-polarized type.

A sending and receiving unit may in particular be an antenna.

According to a further exemplary embodiment of the present invention, the network node may be adapted to provide at least one transmission selected from the group consisting of single stream transmission, dual stream transmission, multiple stream transmission, 4-antenna cooperative transmission and 2-antenna cross-polarized transmission and/or at least one transmission mode selected from the group consisting of spatial division medium access, time division multiple access and frequency division multiple access.

According to a further exemplary embodiment of the present invention, the determination whether to employ 4-antenna cooperative transmission or 2-antenna cross-polarized transmission may be based at least in part on the received indication of a protocol descriptor and/or a received indication of a channel access method of the mobile communication device and/or the at least one further network node.

This determination may in particular take into account channel state information of both communication between the network node and the mobile communication device as well as the transmission between the further network node and the further mobile communication device connected to the further network node.

Thus by switching/choosing which transmission mode to employ interference may further be reduced and/or the transmission rate further increased.

In the following, further exemplary embodiments of the present invention will be described relating to the communication system. Further these explanations also apply to the mobile communication device for distributed cooperative multi-antenna communication, to the network node for distributed cooperative multi-antenna communication, to the method for determining of a protocol descriptor and to the method for determining of a protocol descriptor for distributed cooperative multi-antenna communication.

According to a further exemplary embodiment of the present invention at least one of the first and the second mobile communication device is providing an indication of a protocol descriptor to at least one of the first and the second network node, wherein at least one of the first and the second network node is providing an indication of the protocol descriptor to at least one of the second and first network node and wherein at least of the first and the second network is adapted to determine a protocol descriptor based at least in part on the indication of the protocol descriptor of at least one of the first and the second mobile communication device and at least one of the second and first network node.

Accordingly, the communication system may schedule the transmissions between the at least two network nodes and the at least two mobile communication devices for at least reducing interference and/or increasing transmission rate.

In the following, further exemplary embodiments of the present invention will be described relating to a method.

However, it is to be understood that explanations relating to a method may also relate to the mobile communication device for distributed cooperative multi-antenna communication, to the network node for distributed cooperative multi-antenna communication and to the communication system.

According to a further exemplary embodiment of the present invention a method may further comprise the unification of a codebook for distributed cooperative multi-antenna communication by employing network node sub-set selections for cooperation.

Using an according unification may allow for a preferred cooperation of adjacent network nodes, in particular for conditioning transmissions between mobile communication devices and network nodes in one's another vicinity for the reduction of interference.

A unified sub-set of a codebook may be understood as a codebook with reduced entries which are in particular advantageously adapted for a particular, current transmission situation.

According to a further exemplary embodiment of the present invention a method may further comprise FDMA to SDMA mode switching by SDMA mode selection employing a precoding matrix indicator for grouping of users.

According to a further exemplary embodiment of the present invention a method may further comprise tree-based PMI feedback for feedback compression.

Tree-based PMI feedback compression may allow a signalling of preferred codebook entries while reducing the amount of data necessary for indication of the respective codebook entry/entries. It may further be understood as a preselection of codebook entries, which may be most advantageous for a particular communication situation, thus reducing the amount of feedback data by unrequired or unfavourable for the current communication situation or scenario.

According to a further exemplary embodiment of the present invention a method may further comprise protecting feedback information of resource blocks individually or in resource block groups.

An according protection may be seen protecting feedback information while minimizing the effect of a code failure so that only signal information directly related to the failed error correction code is to be voided. Thus, an according protection may be understood as reducing or minimizing the impact of a code error from a complete time slot to a single resource block or at least a particular group of resource blocks.

According to a further aspect of the present invention a mobile communication device is provided, further adapted to provide at least one transmission selected from the group consisting of single stream transmission, dual stream transmission, multiple stream transmission, 4-antenna cooperative transmission and 2-antenna cross-polarized transmission and/or at least one transmission mode selected from the group consisting of spatial-division medium access, time-division multiple access and frequency-division multiple access.

According to a further aspect of the present invention a network node is provided, wherein at least one of the at least two sending and receiving units is of cross-polarized type.

The idea of the PMI selection may be seen as follow:

In a reduced complexity method, choose PMI for following:
a) one diversity mode (one stream only)
b) one multiplexing mode (maximum number of streams depending on number of network codes cooperating)
c) the above two modes repeated now with non-cooperating case.

A second variant: a generalised definition for global feedback, implements the sub-set unification principle. It may comprise a fixed codebook size, e.g. 16, 32, 64, but entries of the codebook may constitute PMI's corresponding to different sub-sets of cooperating nodes.

According to a further aspect of the present invention a network node is provided, adapted to provide at least one transmission selected from the group consisting of single stream transmission, dual stream transmission, multiple stream transmission, 4-antenna cooperative transmission and 2-antenna cross-polarized transmission and/or at least one transmission mode selected from the group consisting of spatial-division medium access, time-division multiple access and frequency-division multiple access.

According to a further aspect of the present invention a network node is provided, wherein the switching whether to employ 4-antenna cooperative transmission or 2-antenna cross-polarized transmission is based on at least in part on the received indication of a protocol descriptor and/or a received indication of a channel access method of the mobile communication device and/or the at least one further network node.

According to a further aspect of the invention, a method for unification of a codebook for distributed cooperative multi-antenna communication is provided, which considers the base station sub-set selections for cooperation.

According to a further aspect of the invention, a method for modifying of the codebook for distributed cooperative multi-antenna communication or a sub-set of it with the entries of codebook 10-15 is provided for a case of 4 transmit antennas, e.g. 2 network nodes each with 2 antennas.

According to a further aspect of the invention, the method of the mobile communication device reporting the protocol descriptor based on the codebook for distributed cooperative multi-antenna communication for both single stream and dual stream transmission is provided.

According to a further aspect of the invention, the method of mobile communication device reporting the MCS levels by using the 16 codebooks of the codebook according to the invention, which may be seen as a modification of the codebook according to LTE standard with additional six codewords (codebook entries) of a codebook for distributed cooperative multi-antenna communication, in particular entries 10-15 is provided.

According to a further aspect of the invention, the method by which the network node makes a scheduling decision based on the reports of the mobile communication device is provided.

According to a further aspect of the invention, the method of FDMA to SDMA mode switching as proposed in SDMA mode selection based on grouping users with PMI choice is provided.

According to a further aspect of the invention, the method of the mobile communication device reporting protocol descriptor based on minimising effective interference using code words from the codebook for distributed cooperative multi-antenna communication is provided.

According to a further aspect of the invention, the method of tree-based PMI feedback is provided.

According to a further aspect of the invention, the method of encoding and transmitting two sets of feedback, a global feedback per time slot and local feedback per resource block is provided.

According to a further aspect of the invention, the method of hierarchical precoding codebook and feedback of hierarchical precoding codebook based on tree-based PMI feedback is provided.

According to a further aspect of the invention, the method of providing an indication as to the assortment of full cooperative multi-stream, subset cooperative multi-stream or non-cooperative multi-stream in feedback is provided.

According to a further aspect of the invention, the method of tree-based PMI feedback in grid of beams is provided.

According to a further aspect of the invention, the method of adaptively varying the global feedback size and/or the indication therefore is provided.

According to a further aspect of the invention, the method of exploiting the Fubiny-Study Criteria for implicitly calculating the PMI with minimum interference for SDMA-mode is provided.

According to a further aspect of the invention, the method of grouping users based on the Fubiny-Study criteria in SDMA mode is provided.

According to a further aspect of the invention, the method of combining diversity and multiplexing users in SDMA mode based on the feedback mechanism and user grouping by Fubiny-Study criteria is provided.

According to a further aspect of the invention, the method of alternating CQI feedback of FDMA and SDMA mode over frequency resource blocks is provided.

According to a further aspect of the invention, the method of varying the number of CQI levels in feedback in SDMA mode is provided. The CQI quality, whether it is accurate or interpolated is also possible.

According to a further aspect of the invention, the method of bit interleaving over various transmission modes such as FDMA and SDMA modes with different CQI feedback quality to exploit code-diversity and error diversity is provided.

According to a further aspect of the invention, the method of feedback compression with run-length encoding when using the inventive feedback format is provided.

According to a further aspect of the invention, the method by which a joint Hadamard-Convolutional coder is employed for reliable feedback is provided.

According to a further aspect of the invention, the method of protecting the feedback information of resource blocks either individually or in groups of such resource blocks instead of all the resource blocks in one time slot is provided.

According to a further aspect of the invention, the method of feedback consistency verification "CQI inequality check" is provided.

It is to be understood that the indication may also consist of or comprise an indication as to the codes employed, e.g. a code index, channel state information and/or channel access method information.

These and other aspects of the present invention will become apparent from and elucidated with reference to the embodiments described hereinafter.

Exemplary embodiments of the present invention will be described below with reference to the following drawings.

The illustration in the drawings is schematic. In different drawings, similar or identical elements are provided with similar or identical reference numerals.

The figures are not drawn to scale, however may depict qualitative proportions.

BRIEF DESCRIPTION OF THE DRAWINGS

FIG. 2 shows a block diagram of transmission scheduling according to an exemplary embodiment of the present invention, FIGS. 3a,b show a list of transmission codes (a codebook) for distributed cooperative multi-antenna communication according to an exemplary embodiment of the present invention.

FIG. 6 shows a diagram of an exemplary minimum rate characterization with Proportional Fair OFDMA Scheduling according to the present invention, FIGS. 7a,b show a flowchart of a method for determining of a protocol descriptor and a method for determining of a protocol descriptor for distributed cooperative multi-antenna communication according to an exemplary embodiment of the present invention.

FIGS. 11a,b show a feedback encoding format according to the present invention combining a hamming code with a parity code.

DETAILED DESCRIPTION

Figure 1:
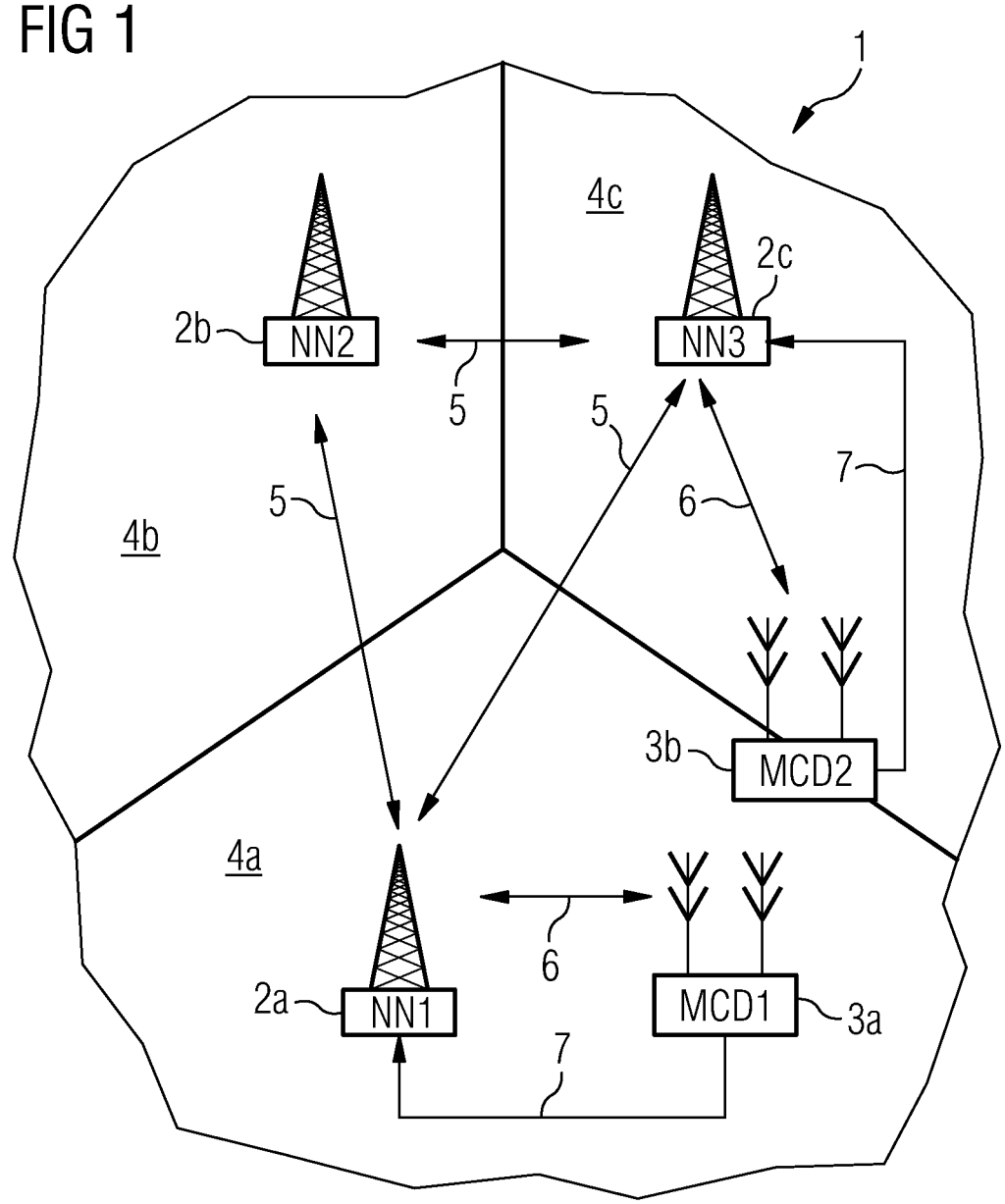
FIG. 1 shows a block diagram of a communication system according to an exemplary embodiment of the present invention.

Now referring to FIG. 1, an exemplary embodiment of a communication system according to the present invention is depicted.

In FIG. 1, a communication system 1 is depicted comprising three individual cells 4a,b,c that define a coverage area of each of the three network nodes 2a,b,c. The network nodes 2a,b,c are communicatively coupled with one another by feedback link 5. Two mobile communication devices 3a,b are depicted as well.

Mobile communication device 3a is communicatively coupled with network node 12a via communication link 6. Mobile communication device 2 3b is communicatively coupled with network node 3 2c via a further communication link 6. Mobile communication device 1 3a and 2 3b are located in ones another vicinity, thus it may be assumed that when communicating in parallel at the same time both mobile communication devices constitute a possible interference source for the respective other mobile communication device 3a,b.

It may be assumed that mobile communication device 1 3a is trying to establish a new communication over communication link 6 while mobile communication device 2 3b is currently transmitting or also commencing a communication over communication link 6.

Mobile communication device 1 3a provides channel state information, a protocol descriptor and/or an index of a code of a codebook to be used to network node 1 2a.

The same may be performed by mobile communication device 2 3b with network node 3 2c.

Since network node 1 and network node 3 2a,c are communicatively coupled via feedback link 5 the network nodes inform each other regarding the intended transmission thus a scheduling may take place to determine transmission parameters for both the transmission between network node 1 and mobile communication device 1 3a and network node 3 2c and mobile communication device 2 3b to obtain a transmission with a preferably minimized interference level regarding the respective other communication.

A mobile communication device may have multiple antennas, in particular two antennas for MIMO transmission.

Now referring to FIG. 2 an exemplary embodiment of transmission scheduling according to the present invention is depicted.

Mobile communication device 1 3a determines a protocol descriptor, in particular a modulation coding scheme level and may thus determine a transmission mode to be either cooperative FDMA or SDMA. Mobile communication device 1 3a is communicatively coupled via communication link 6 with network node 1.

The indication regarding the modulation coding scheme level (or protocol descriptor, channel state information, code index) may be provided to network node 1 2a via indication 7 from the mobile communication device 1 3a to the network node 1 2a.

The same is performed by mobile communication device 2 3b and network node 3 2c.

Consequently, both the network node 1 2a and the network node 3 2c now have information regarding a desired protocol descriptor and a transmission mode.

Network node 1 2a and network node 3 2c may now perform a joint scheduling decision 8 based on the protocol descriptor and subsequently the modulation coding scheme desired.

The shown scheduling may take into consideration the determined protocol descriptors and the desired transmission modes of mobile communication devices 1 and 2 2a,b to arrive at a transmission between mobile communication device 1 3a and network node 1 2a and mobile communication device 2 3b and network node 3 2c respectively for minimizing interference.

Thus, it may be an aspect of the invention determining at different locations coding scheme dependent channel conditions. These coding schemes or at least related indications may be exchanged between network nodes.

Now referring to FIGS. 3a and 3b, a list of transmission codes for distributed cooperative multi-antenna communication according to the present invention is depicted.

A codebook design in 4×2 mode may not consider an application of employing cross-polarized sending and receiving units.

A codebook design for cooperative MIMO according to FIG. 3a is provided.

Relating to the provided codebook for cooperative MIMO is a sub-set unification principle, which is explained in the following.

For M cooperating transmit stations, e.g. network nodes, each being equipped with N antennas, $L_M = 2^{NM}$ codebooks forming a set C may be possible.

However, in particular in addition, precoding via subgroups of network nodes from a total of M network nodes may also be conceivable.

Let $L_{M-k} = 2^{N(M-k)}$ be the number of precoding options by selectively removing one of the cooperating stations.

Thus, a total of $$P_{M-k} = \frac{M!}{(M-k)!k!}$$

such combinations is conceivable.

Let $C_k$ be all the codebooks obtainable.

The resulting codebook for distributed antenna systems may be proposed to be $$C' = C \cup C_1 \cup C_2 \cup C_3 \cup \ldots C_M$$

by uniting all individual codebooks, thus obtaining a total of $$L' \leq L + \sum_{k=1}^{k=M-1} P_{M-k} L_{M-k}$$

codebooks.

For feedback limitation, a precoding table of length $L=2^{NM}$ may chosen from this unified set C'.

This may be relevant for obtaining both the benefits of diversity and polarisation dependent gains. This may be due to the fact that the channel of only a subset of network nodes may be conditioned beneficially with polarisation.

In FIG. 1 only NN1 and NN3 may cooperate as per the schema of FIG. 2.

When considering a system with 2 tx antennas per network node and two network nodes cooperating, 16 unitary precoding codebook entries per spatial mode may be possible for these 4 cooperative antennas.

For example, three 2×2 precoding matrices for two antenna ports may be used as follows.

Two of these matrices, $A_2$ and $A_3$, may be obtained from the subset of a FFT matrix, given by $FFT(I_4)$ (4×4 Identity matrix) as depicted in FIG. 3b, while a third matrix $A_1$ is an identity matrix according to FIG. 3b. The matrices are mutually orthogonal and may be obtained from a subset of $FFT(I_4)$.

For 4 transmit antenna ports, the codebook design may be obtained via the formula $$W_n = I - 2 u_n u_n^H / u_n^H u_n$$

with I being the 4×4 identity matrix and the vector $u_n$ according to FIG. 3a.

The entry $W_n$ of the codebook, wherein n is the index, may be generated by subtracting from an 4×4 identity a vector product of two times the vector $u_n$ multiplied by its hermitian $u_n^H$ and divided by the hermtian $u_n^H$ multiplied by the vector $u_n$.

A total of 16 precoding codebooks may be possible with 4 ports.

Using the sub-set unification principle, in total L'=22 codebooks may be obtainable for a cooperative system, represented by the set C'.

An exemplary precoding table for cooperaton MIMO is shown in FIG. 3a.

The elements $u_n$ may be obtained from a subset of $FFT(I_8)$.

The codebook may be seen as containing a total of 16, 4×2 subset matrices which may be used in each mobile communication device 3a,b to allow for a cooperation mode switching using feedback from a mobile communication device 3a,b.

The mobile communication device 3a,b may provide an indication as to which matrix is to be used for the communication to a network node 2a,b,c. An indication may be understood as providing an information to the network node 2a,b,c. An indication may be the codebook index as of FIG. 3a.

Thus, each mobile communication device 3a,b may e.g. signal the index of a subset matrix, which may be determined based on channel state information to provide beneficial signal power when communicating with a network node 2a in the vicinity of a further network node 2b,c.

Also or in addition, a protocol descriptor or modulation coding scheme information or levels may be indicated, in particular one for single stream transmission and one for dual stream transmission, thus two protocol descriptors or modulation coding scheme levels.

A supportable modulation coding scheme level may be multiplied by a factor of 0.5, thus reducing a half degree of freedom.

The reduction may in particular be employed in order to take into account that 2 data streams are employed in FDMA, while 4 data streams are employed in SDMA.

For the following explanation an according precoder is indexed as m.

In the following, SDMA mode selection may be assumed.

In cooperative SDMA mode, two mobile communication devices 3a,b may be supported simultaneously, i.e. in the same frequency resource block. Two network nodes 2a,b,c, each with two antennas may be assumed to cooperate to support this mode.

Both network nodes 2a,b,c may employ the following precoding operation:

$$\begin{bmatrix} H_1 \\ H_2 \end{bmatrix} \begin{bmatrix} v_1^{e1} & v_1^{e2} & v_2^{e1} & v_2^{e2} \end{bmatrix} \begin{bmatrix} \sqrt{P_{11}} & 0 & 0 & 0 \\ 0 & \sqrt{P_{12}} & 0 & 0 \\ 0 & 0 & \sqrt{P_{21}} & 0 \\ 0 & 0 & 0 & \sqrt{P_{22}} \end{bmatrix} \begin{bmatrix} x_{u1}^1 \\ x_{u1}^2 \\ x_{u2}^1 \\ x_{u2}^2 \end{bmatrix}$$

Matrices $H_1$ and $H_2$ denote the respective channels of two users $U_1$ (MCD1) and $U_2$ (MCD2), vectors v are the precoding vectors, matrix elements P, denote the power loaded into the data streams and x represents the data streams. Here as an example, there are 4 data streams.

For enabling SDMA mode, a mobile communication device 3a,b may provide an indication as to a codebook entry, e.g. may signal an index of an entry of the codebook matrix (0-15) which may beneficially influence a transmission, e.g. would minimize interference power. For the further explanation an according precoder is indexed n.

Furthermore, a modulation coding scheme level supportable in downlink in case an according precoder is employed is determined. The related interference may be computed as well and signaled also to the network node 2a,b,c.

In particular, two protocol descriptors or modulation coding scheme levels may be determined for a beneficial transmission, one for single stream interference and a further one for dual stream interference.

Network nodes 2a,b,c, which in an example may be at least two, cooperatively schedule both connected mobile communication devices 3a,b by providing a signal, (m, n) and (n, m) respectively, to the individual mobile communication devices 3a,b for indicating a transmission in a(n identical) time/frequency slot in SDMA mode.

M, n may be interpreted as two precoder IDs used on two user connection IDs m, n.

This SDMA mode may be selected only, if the transmission rate supported by the SDMA mode is higher than the TDMA/FDMA orthogonalization of the two mobile communication devices 3a,b.

In orthogonalization, no interference is present. Because all network nodes, in this case, 2 base stations, serve the same users. That is referred to as TDMA/FDMA orthogonal mode.

Figure 4:
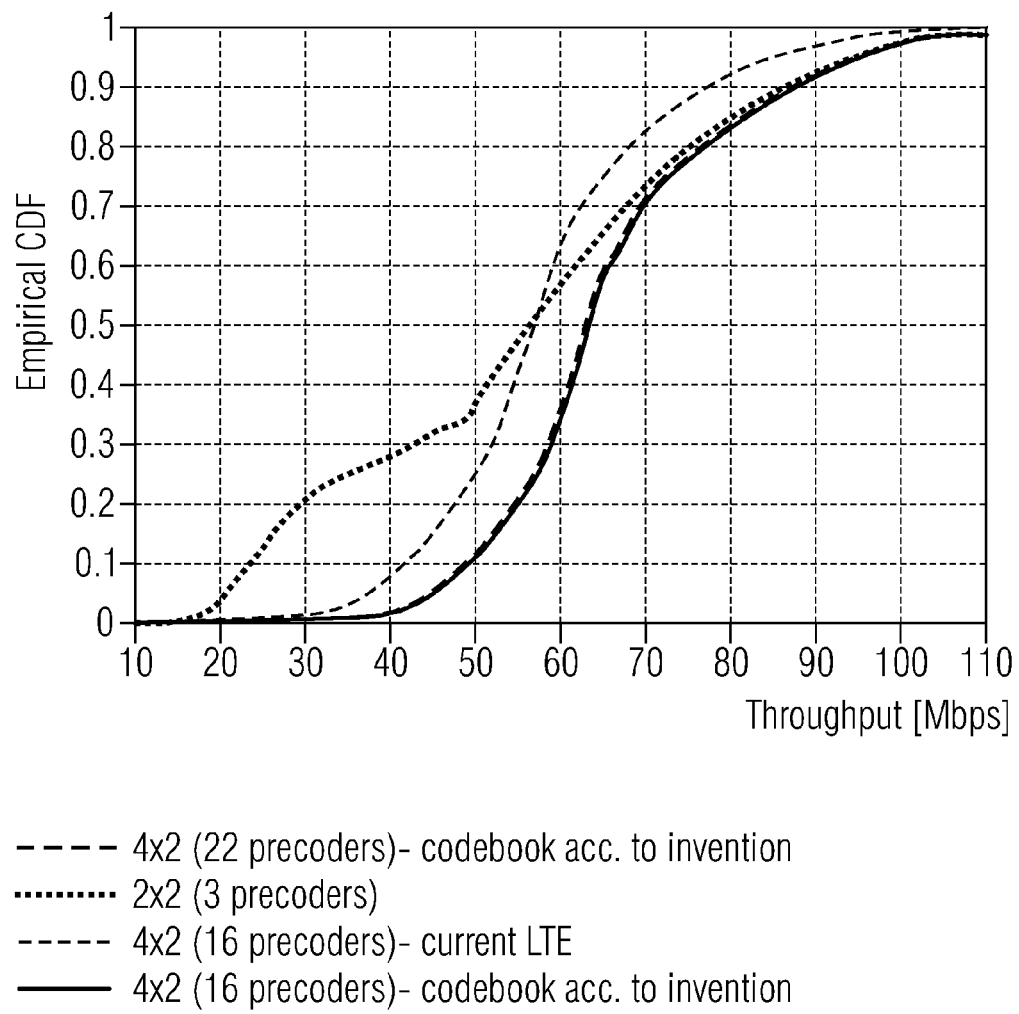
FIG. 4 shows a diagram comprising different performance gain cases for a codebook according to an exemplary embodiment of the present invention.
Figure 5:
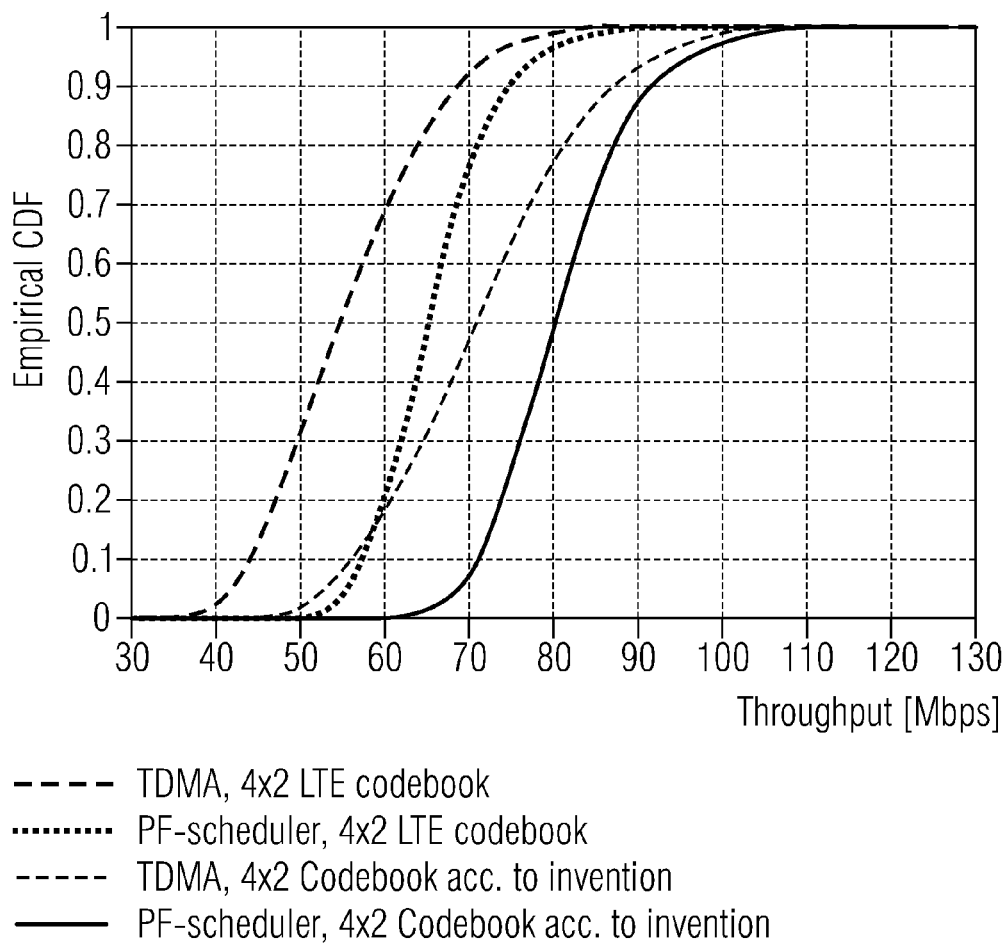
FIG. 5 shows a diagram of an exemplary sum rate characterization with Proportional Fair OFDMA Scheduling according to the present invention.

The performance of the codebook according the present invention is shown in FIGS. 4 to 6.

The drawings depict the transmission throughput on the X-axis and the empirical cumulative distribution function on the Y-axis.

SNRdB may be considered to be substantially equal to 12 bB.

Now referring to FIG. 4, an exemplary codebook performance according to the present invention is depicted.

FIG. 4 depicts the throughput characterization with a codebook according to the present invention in cooperative MIMO mode. In particular, this may be the input to the network node scheduler.

Characterization here means the statistical distribution and is also referred to as CDF, the cumulative distribution function.

Interference is not taken into account. The drawing illustrates the gain of cooperation without sector interference.

Now referring to FIG. 5, an exemplary sum rate characterization with Proportional Fair OFDMA Scheduling according to the present invention is depicted.

FIG. 5 depicts the performance with joint scheduling with 4 users per OFDMA time slot. A joint proportional fair scheduling in time and frequency domains is used cooperatively by the network nodes. The sum rate characterisation, i.e. the sum throughput characterization depicts 4 users in cooperative MIMO mode. Depicted is the output of network node scheduler. The case of 2×2, two sectors with interference is not considered.

Now referring to FIG. 6, an exemplary minimum rate characterization with Proportional Fair OFDMA Scheduling according to the present invention is depicted.

FIG. 6 depicts the minimum rate characterisation, i.e. the minimum throughput characterization related to FIG. 5 in cooperative MIMO mode. Depicted is the output of network node scheduler.

Now referring to FIG. 7a, a method for determining of a protocol descriptor is depicted.

The flow diagram of method 20 shown in FIG. 7a is a method for determining of a protocol descriptor or a modulation coding scheme. The method 20 comprises in step 21 determining channel state information of a communication channel, in step 22 determining a protocol descriptor at least in part by employing channel state information and/or at least one code of a list of transmission codes for distributed cooperative multi-antenna communication, and in step 23 providing an indication of the determined protocol descriptor to a network node.

Now referring to FIG. 7b, a flow diagram of a method for determining of a protocol descriptor for distributed cooperative multi-antenna communication is depicted.

The flow diagram of method 30 shown in FIG. 7b is a method for determining of a protocol descriptor for distributed cooperative multi-antenna communication. The method 30 comprises in step 31 receiving an indication of a determined protocol descriptor from a mobile communication device, in step 32 receiving an indication of a determined protocol descriptor from at least one network node, and in step 33 of determining a protocol descriptor or a modulation coding scheme for distributed cooperative multi-antenna communication at least in part based upon the received indication of the determined protocol descriptor from the mobile communication device and the received indication of the determined protocol descriptor from the at least one network node.

Figure 8:
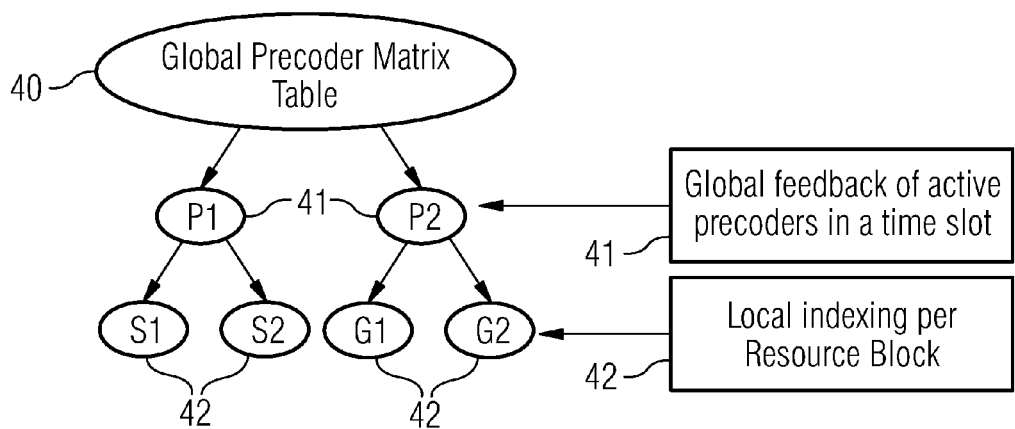
FIG. 8 shows a feedback reduction mechanism according to the present invention.

Now referring to FIG. 8, a feedback reduction mechanism according to the present invention is depicted.

In particular, a tree-based representation of feedback is employed.

V is considered to be the feedback vector of dimension 1×B over B resource blocks per time slot.

An issue in feedback limitation may be to advantageously exploit the redundancies in the precoding codebook entry selected, i.e. a number from 0-15 by the mobile communication device in each time slot.

A full feedback of this precoding table may incur a significant overhead of N×M×B bits over B resource blocks in each time slot.

For example, in the case of 2 Tx antennas per network node, two cooperating network nodes and 48 resource blocks, this may amount to 192 bits per time slot for precoding information alone, which may be interpreted as the PMI (precoding matrix index).

One aspect may be determining how to cut down on the feedback cost (i.e. feedback bits required to transmit feedback information) by exploiting redundancies but without significantly sacrificing downlink performance.

A feedback reduction mechanism based on the Fubiny-Study distance criteria has been proposed, however, lacking several key aspects.

Firstly, the precoding matrix per resource block may be indicated among the four precoders closest to a globally optimum precoder. However, this may not need to be the case.

Furthermore, with cooperating network node antennas, it may more important to avoid the precoders which lie close to the null of a mobile communication device. This may be achieved by explicitly pointing out such frequency resource blocks. Such a mechanism may make the feedback rate variable.

Also, the precoding index for single stream diversity option may carry a different PMI value, which may not need to be a subset of an according multiplexing PMI value.

Moreover, the distribution of received signal power from two network nodes may vary over the frequency resource blocks. In channel scenarios with high frequency selectivity, this variation may be significant. Therefore, the precoders for these resource blocks need to be pointed out accurately.

Accordingly a feedback representation mechanism according to the present invention is proposed, called tree-based precoder matrix indexing protocol.

This method may be interpreted as having two hierarchical parts of feedback:

Firstly, global feedback pre-selection is performed, i.e. determining the active subset 41 of m precoders selected from the entire codebook. In other words, each branch from the global precoder matrix table 40 indicates the permutation of precoding indices active for this time slot The active precoders set ma be seen as the list of precoders which may be used repeatedly over various frequencies. These may be the beneficial set of precoders for that timeslot.

There are numerous ways to determine an active set.

E.g., the set of precoders may be determined to provide the highest sum-rate gain over the frequencies or may be the set of precoders listed with the highest usage over the frequencies. For example, precoder index 10 used 7 times, index 2 used 5 times, index 8 used 3 times, index 14 used 3 times.

Secondly, local indexing per resource block is performed, indicating the index of precoder amongst active precoders. This is similar to indexing the member of each branch in the tree.

In FIG. 8, P1 indicates a specific permutation of 2 precoding matrices chosen from the 16 precoding matrices of the codebook according to the present invention. S1 and S2 indicate the local indexing of the members belonging to the parent node, P1. This local indexing is performed per resource block.

The global feedback of parent node P1, is performed by the mobile communication device dynamically in each time slot.

P2 may be seen as the set of precoders which are (currently) inactive in FIG. 8, but may become active in another time slot.

Global feedback may be seen as indicating the active set of precoders for the timeslot. Local indexing may be understood as pinpointing to one precoders from the active set for each frequency.

For the cooperative scheme illustrated in FIG. 8, with 2 Tx antennas per network node and two network nodes cooperating, the following method is provided:

A mode indicator field is provided. This mode indicator field indicates the number of precoding matrices active in a time slot and the assortment of number of precoders. i.e. the numbers of active dual stream precoders and the numbers of active single stream precoders.

The number refers to amount of precoders. In some time slots, only 2 precoders may be deemed useful, in some other time slots 4 precoders may be deemed useful.

The maximum number of active precoders for feedback reduction may preferably be four.

This may reflect the following:

One dual stream best precoder may be most beneficial over the entire band, with full cooperation, one dual stream precoder may be most beneficial over the entire band for antenna subset selection, one single stream precoder may be most beneficial for full cooperation from two network nodes and a further one single stream precoder may be most beneficial for antenna subset selection, thus amounting to four active precoders taking into account four individual transmission scenarios.

However, the number of dual stream and single stream precoders could be varied as shown in table 3.

TABLE 3

| # active precoders | 4 |
|---|---|
| 4 DS | 00 |
| 3 DS + 1 SS | 01 |
| 2 DS + 2 SS | 11 |
| 1 DS + 3 SS | 10 |

The right column shows the bit sequence corresponding to left. In the right column the bit sequence used for indicating the respective precoder distribution of the left column is displayed.

This table depicts an Optional Mode Indication Table for a subset of 4 active precoders and refers to the assortment of precoders used per time slot.

Therefore, the feedback field, i.e. the PMI feedback field format, is shown in table 4 for a feedback of 4 active precoders

TABLE 4

| Field A4 | Field A3 | Field A2 | Field A1 |
|---|---|---|---|
| Y bits per resource block | L bits | 2 bits (optional) | 2 bits |

Field A1 indicates the number of active precoders. Value k<4.

Field A2 indicates the assortment of dual stream and single stream precoders.

Field A3 indicates the permutation of active precoders used in time slot. L=4 k bits Field A4 indicates the local precoder index in the 4 precoders. Y=$\log_2(k)$ bits The variable k refers to the number of active precoders.

Field A2 may be removed e.g. by defining that m/2 precoders are employed for dual stream transmission and m/2 precoders are for employed for single stream transmission with a total of m active precoders in a time slot.

For global feedback information 41, signaling back the 4 most advantageous PMI values, which are calculated over the whole bandwidth, may be preferred. This may result in a feedback vector containing 16 bits per feedback transmission.

In the local indexing 42, i.e. the PMI indicator, for each sub-band it may be signaled, which of the 4 most preferred PMI values contained in the global information 41 may be considered to be the most advantageous for that particular sub-band. This may require 2 bits of feedback per sub-band. E.g. for 20 sub-bands, this may amount to 40 bits.

In total, the tree-based representation of feedback containing local channel quality information 42 and global channel quality information 41 may require 56 bits.

Figure 9:
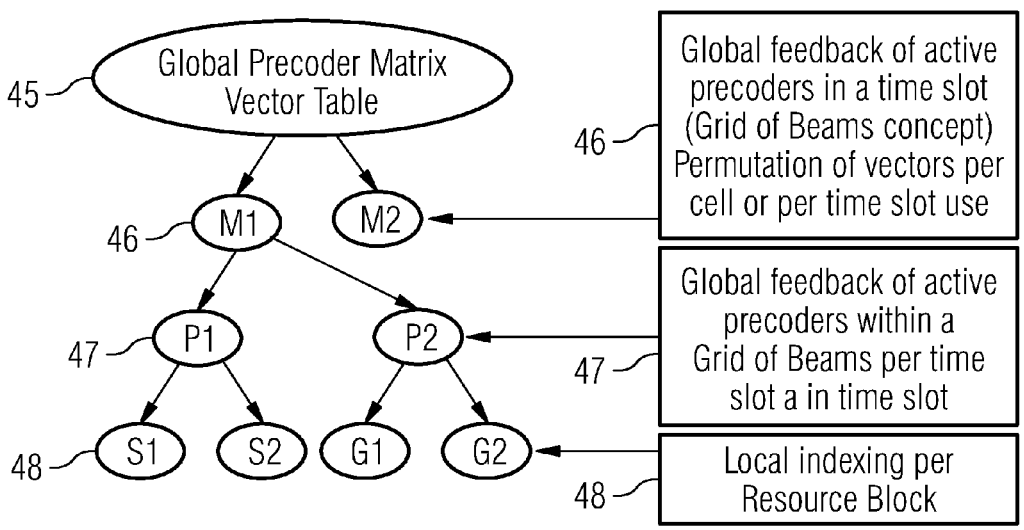
FIG. 9 shows the feedback reduction mechanism of FIG. 8 now extended to hierarchical codebooks.

Now referring to FIG. 9, the feedback reduction mechanism according to the present invention extended to hierarchical codebooks is depicted.

An extension of the global feedback scheme may be seen as to implement hierarchical codebooks.

An exemplary instance of the hierarchical codebooks is the grid of beams (GoB) concept.

Grid of beams here refers to a fixed list of precoders (known as vectors) allotted per sector. For example, to a fixed allocation of 4 for each sector, likewise for 3 or more sectors.

It may be seen as being similar to the codebook table, with a difference that only vectors for single stream transmission are defined. For multi-stream transmission, each stream may use one vector from the set of vectors.

A set of beamforming vectors may be pre-defined at a global level 40.

A given permutation of beamforming vectors may constitute a codebook at the second hierarchy level 46. Such a hierarchy may be defined either spatially over a number of cells or in time slots.

In the third hierarchy level 47, the active precoders within a subset of GoB may be performed in each time slot.

In the fourth hierarchy level, local indexing is used per resource block to indicate the most preferred precoder.

The concept may be understood as follows:

An outer list of vectors may be first defined, referred to as global precoder vectors.

Per each cell, for a span of time slots, e.g. 10 time slots, each mobile may choose a sub-list of vectors from the global list. The sub-list may be predefined and indicated as M1, M2.

Particularly in each timeslot, i.e. one out of the 10 timeslots, each mobile again may choose a sub-sub-list of vectors from the predefined list M1. This is indicated as P1, P2.

For each frequency in each time slot, each mobile indicates which of precoders in the sub-sub-list P1 may be used.

Figure 10:
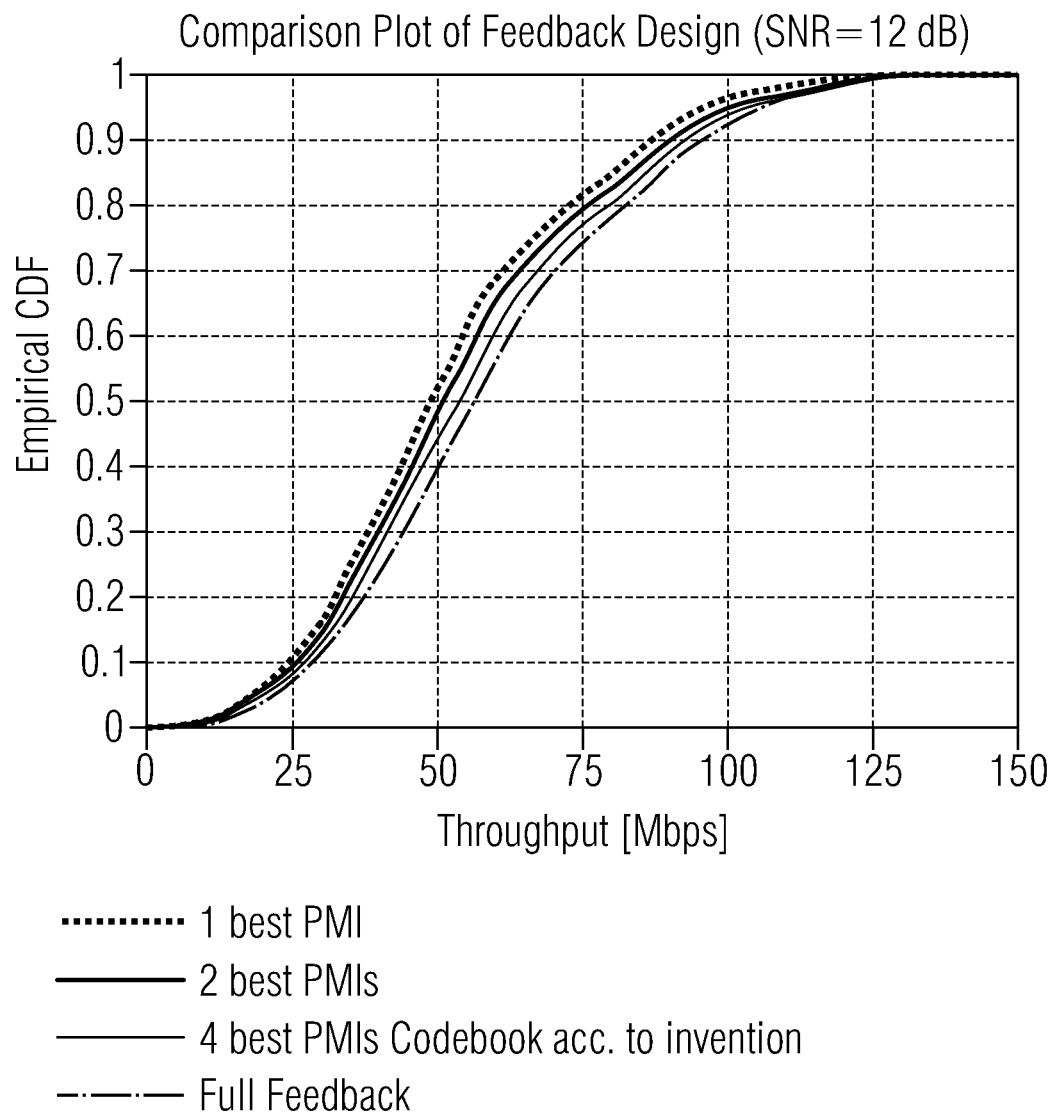
FIG. 10 shows a comparison of the throughput performance of the full feedback schema with 3 different feedback schemas.

Now referring to FIG. 10, a comparison of the throughput performance of the full feedback schema with 3 different feedback schemas is depicted.

In particular, a comparison of throughput performance using 1 PMI, 2 PMIs, 4 PMIs and full feedback (i.e. a PMI for each resource block) is depicted, i.e. a comparison of different feedback schemas for codebook-based precoding.

The simulations were performed according to a 3G-LTE draft. The simulation was performed using results from channel measurements carried out with a 3G-LTE test-bed in an urban outdoor environment. The detailed simulation assumptions (Parameter set for measured channel data) are summarized as follows:
System Parameters:
Antenna configuration: 4 transmitters, 2 receivers
Channel model: Urban Environment
Mobile speed [km/h]: 3-5 km/h
Resource block size: 25 sub-carriers
Symbols per TTI: 7
Number of resource blocks: 48
Modulation: 4-QAM, 16-QAM, 64-QAM
Channel coding rates: Convolutional coding with code rate ½
Feedback granularity: 3 Resource Blocks As may be taken from FIG. 10, a throughput performance loss of 2 Mbps is obtainable using the 4 best PMIs (i.e. those 4 PMIs which may provide the best transmissions with minimized interference) as compared to a throughput performance loss of 7.4 Mbps in case the best PMI is fed back.

For the cell-edge users (5%-quantile), the full feedback and 4-best PMI curves may substantially converge while signaling back only the best PMI results in cell-edge users having a loss in throughput of approx. 3 Mbps.

For one antenna with a feedback granularity of 3 and employing the 4-best PMI feedback mechanism, the feedback may cut down by 25% resulting in 48 feedback bits per antenna.

Feedback granularity of 3 may indicate that 3 frequency resource blocks use the same precoder. This may be seen as providing a redundancy level of 3.

Now referring to FIGS. 11a and b, a feedback encoding format according to the present invention combining a hamming code with a parity code is depicted.

An overall design principle for feedback protection is provided.

This may prevent feedback protection mechanisms which may employ an error correction code over all the frequency resource blocks. This may in particular be inefficient because, if a cyclic redundancy check of a code in a time slot fails, none of the feedback information in a particular resource block may be usable.

Thus, resource blocks may be required to be protected individually. However, individually encoding resource blocks with convolutional code may significantly increase the latency as a corresponding number of trellis decoders may be required.

Resource blocks may also be protected individually with a low complexity error correction code, e.g. a repetition code. However, for error correction purposes, odd numbers of repetitions may be required. Thus, a repetition code of length 3 also increases feedback information.

Accordingly, the combination of a hamming code, e.g. a Hadamard code, with a parity code, e.g. a convolutional code, is proposed.

$2^N$ bits of information (N<3) per resource block may be encoded with a Hadamard code representing $$H_C = \begin{bmatrix} H \\ -H \end{bmatrix}$$

with H being the square Hadamard matrix of dimension $2^{N+1}$.

By performing the above-indicated operation, the information of each resource block may be protected.

An exemplary overall encoding mechanism at a transmitter, e.g. a mobile communication device, is shown in FIG. 11a.

At the receiver, e.g. a network node, the reverse procedure may be implemented, as shown in FIG. 11b.

It should be noted that the term "comprising" does not exclude other elements or steps and that "a" or "an" does not exclude a plurality. Also, elements described in association with different embodiments may be combined.

It should also be noted, that reference signs in the claims shall not be construed as limiting the scope of the claims.

A computer-readable medium may be a floppy disk, a CDROM, a DVD, a hard disk, a Universal Serial Bus (USB) device, a RAM (Read Access Memory), a ROM (Read Only Memory) and an EPROM (Erasable Programmable Read Only Memory).

A computer-readable medium may also be a data communication network, e.g. the internet, which allows downloading a program code.

A mobile communication device may be a mobile phone, a laptop or a PDA or an user equipment in general.

A network node may be a base station, a BTS, a NodeB, an eNB or a wireless routing device in general.

REFERENCE NUMERALS

1 Communication system
2a,b,c Network node
3a,b Mobile communication device
4a,b,c Communication Cell
5 Feedback link
6 Communication link
7 Indication from mobile communication device to network node
8 Scheduling between network nodes
20 Method for determining of a protocol descriptor 21 Step 1 of method 20
22 Step 2 of method 20
23 Step 3 of method 20
30 Method for determining of a protocol descriptor for distributed cooperative multi-antenna communication
31 Step 1 of method 30
32 Step 2 of method 30
33 Step 3 of method 30
40 Global precoder matrix table
41 Global feedback of active precoders
42 Local indexing per resource block
45 Global precoder matrix table
46 Global feedback of active precoders
47 Global feedback of active precoders in a grid of beams
48 Local indexing per resource block

The invention claimed is:

1. An apparatus comprising:
at least one processor;
memory storing a program of instructions;
wherein the memory storing the program of instructions is configured to, with the at least one processor, cause the apparatus to at least;
communicatively coupled with a network node;
determine channel state information; and
provide an indication of modulation resources being used, wherein the indication is in the form of tree-based precoding matrix indicator feedback to a network node, wherein the indication is based at least in part on the determined channel state information, and wherein the feedback comprises global feedback per time slot and local indexing per resource block derived from the global feedback.

2. The apparatus of claim 1, wherein the apparatus stores a list of transmission codes for distributed cooperative multi-antenna communication, wherein determining the indication is based at least in part on at least one code of the list of transmission codes for distributed cooperative multi-antenna communication.

3. The method of claim 1, wherein the indication is a codebook index for conditioning transmissions between the mobile communication device and a network node to minimize interference power.

4. The method of claim 3, wherein the codebook comprises precoders.

5. The method of claim 4, wherein the global feedback is determined by selecting an active precoder or a plurality of active precoders for the time slot.

6. The method of claim 5, wherein the active precoder or a plurality of active precoders for the time slot is taken from a list of precoders repeatedly used over differing frequencies.

7. The method of claim 4, wherein the local feedback indicates an index of a precoder among the active precoders selected for that time slot.

8. The method of claim 1, wherein the indication is a codebook index for conditioning transmissions between the mobile communication device and a network node to maximize signal power from the serving base station.

9. The apparatus of claim 1, wherein the apparatus is a mobile communication device.

10. An apparatus comprising:
at least one processor;
memory storing a program of instructions;
wherein the memory storing the program of instructions is configured to, with the at least one processor, cause the apparatus to at least:
receive from a mobile communication device an indication of a modulation resource being used, the indication being form of tree-based precoding matrix indicator feedback from the mobile communication device, wherein the tree-based precoding matrix indicator feedback comprises global feedback per time slot and local feedback per resource block derived from the global feedback; and communicatively couple with at least one network node; and
determine parameters based on the feedback to minimize interference.

11. The apparatus of claim 10, wherein the apparatus is further caused to perform at least one of providing or receiving the indication from the mobile communication device or an indication of a channel access method to or from the at least one network node.

12. The apparatus of claim 11, wherein the apparatus is further caused to determine a transmission mode for communication with the mobile communication device, wherein the determination is based at least in part on the tree-based precoding matrix indicator feedback from the mobile communication device, the indication of a channel access method of the mobile communication device, or at least one of the received indication from the mobile communication device of a modulation resource being used or the indication of a channel access method of the at least one network node.

13. The apparatus of claim 10, wherein the apparatus is a network node.

14. A method comprising;
receiving, in an electronically transmitted message from a mobile communication device, an indication of a modulation resource being used, wherein the indication is in the form of tree-based precoding matrix indicator feedback comprising global feedback per time slot and local indexing per resource block derived from the global feedback;
receiving in an electronically transmitted message an indication from at least one network node of a modulation resource being used;
determining an indication of a modulation resource for distributed cooperative multi-antenna communication, wherein the determining of the indication of the modulation resource for distributed cooperative multi-antenna communication is based at least in part upon the received indication from the mobile communication device and the received indication from the at least one network node.

15. A method comprising:
determining channel state information of a communication channel;
determining an indication of a modulation resource to be used, based on at least one of channel state information or one code of a list of transmission codes for distributed cooperative multi-antenna communication; and electronically transmitting a message to a network node, wherein the message provides the indication to the network node as feedback in the form of tree-based precoding matrix indicator feedback comprising global feedback per time slot and local indexing per resource block based on the global feedback.

16. The method of claim 15, wherein the indication is a codebook index for conditioning transmissions between the mobile communication device and a network node to minimize interference power.

17. The method of claim 16, wherein the codebook comprises precoders.

18. The method of claim 17, wherein the global feedback is determined by selecting an active precoder or a plurality of active precoders for the time slot.

19. The method of claim 18, wherein the active precoder or a plurality of active precoders for the time slot is taken from a list of precoders repeatedly used over differing frequencies.

20. The method of claim 17, wherein the local feedback for the resource block indicates an index of a precoder among the active precoders selected for that time slot.

* * * * *

UNITED STATES PATENT AND TRADEMARK OFFICE
CERTIFICATE OF CORRECTION

| | |
|---|---|
| PATENT NO. | : 8,825,094 B2 |
| APPLICATION NO. | : 13/133221 |
| DATED | : September 2, 2014 |
| INVENTOR(S) | : Haustein et al. |

It is certified that error appears in the above-identified patent and that said Letters Patent is hereby corrected as shown below:

In the Claims

Claim 10, col. 26, line 18 --in the-- should be inserted in between "being" and "from".

Signed and Sealed this
Eighteenth Day of November, 2014

Michelle K. Lee
*Deputy Director of the United States Patent and Trademark Office*